Figure 1:
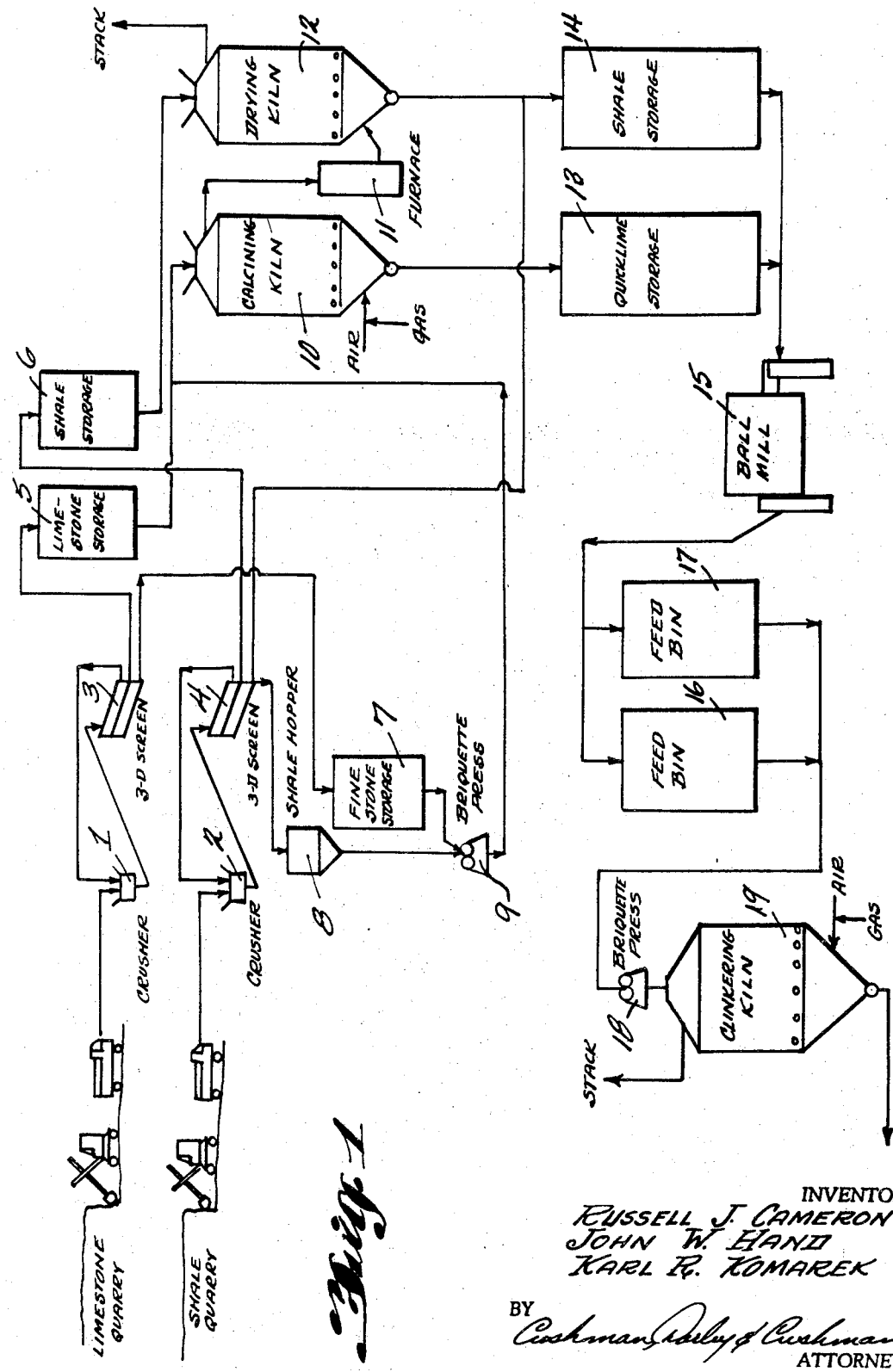

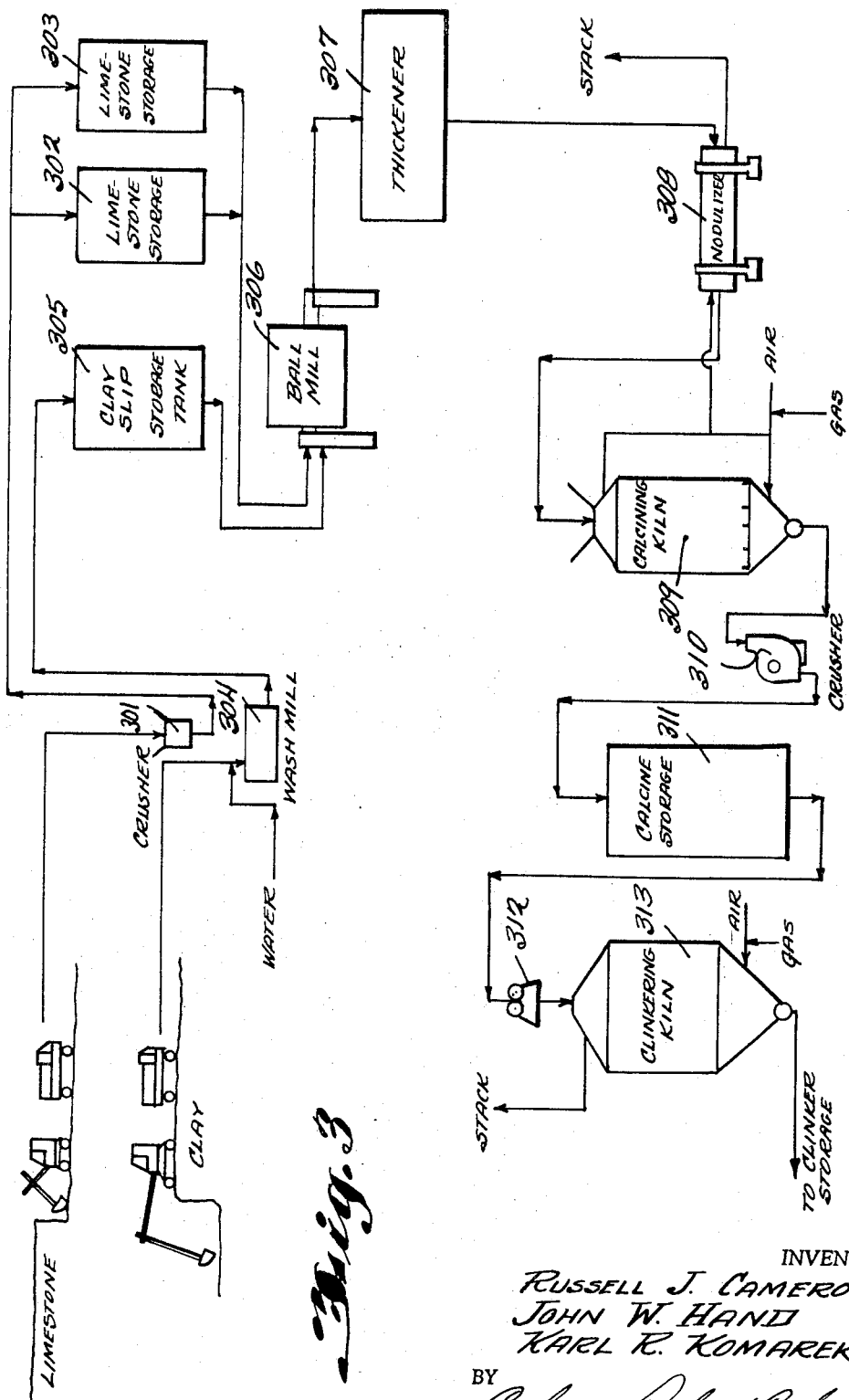

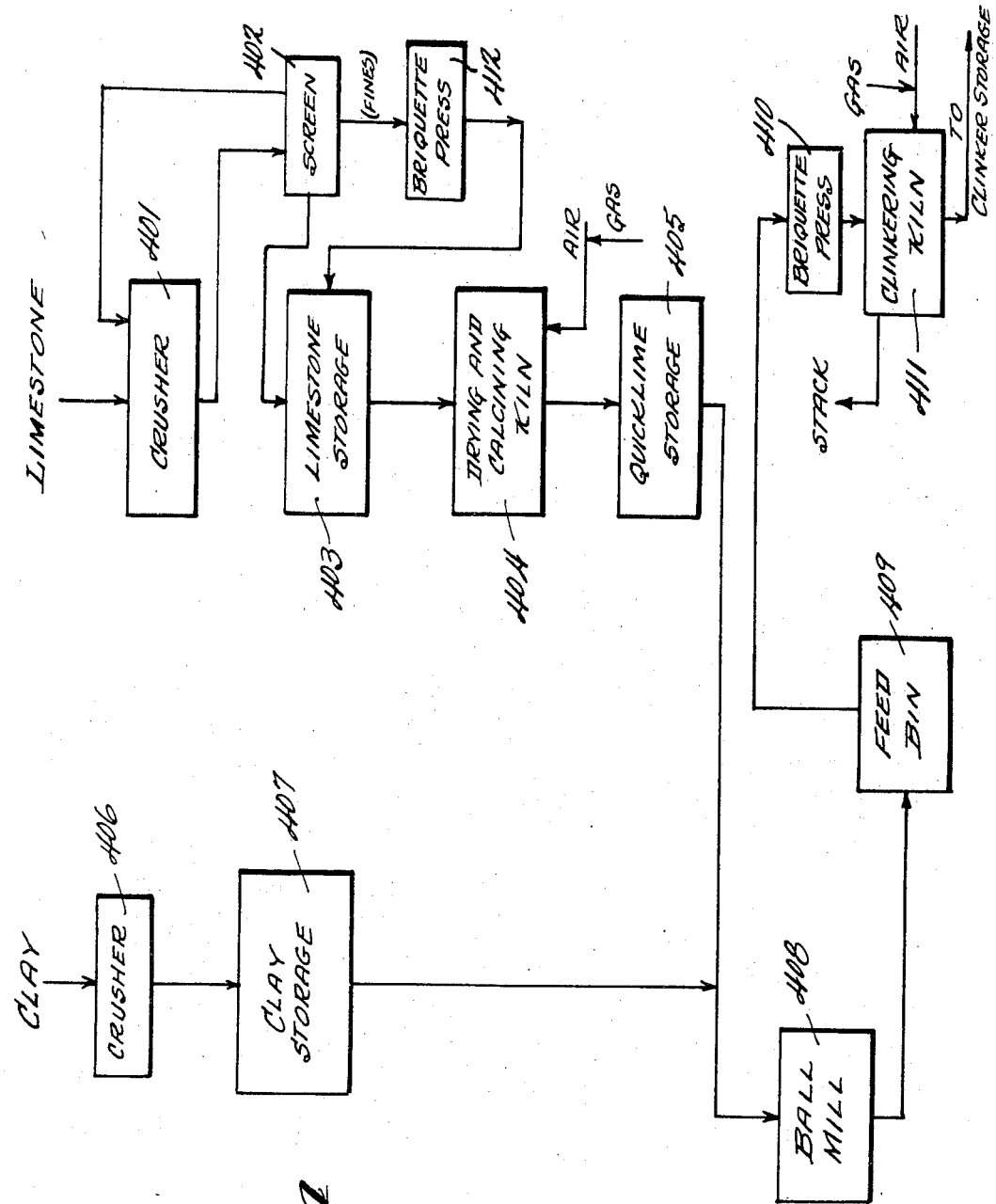

United States Patent Office 3,402,225
Patented Sept. 17, 1968

3,402,225
METHOD OF PREPARING VERTICAL SHAFT KILN FEED FOR PRODUCTION OF PORTLAND CEMENT
Russell J. Cameron and John W. Hand, Denver, Colo., and Karl R. Komarek, Chicago, Ill., assignors of one-half each to Komarek-Greaves and Company, Rosemont, Ill., a corporation of Illinois, and Cameron and Jones, Incorporated, Denver, Colo., a corporation of Colorado
Filed Oct. 7, 1966, Ser. No. 585,008
18 Claims. (Cl. 263—53)

This invention relates to an improved process for preparing cement kiln feed. More specifically, this invention relates to an improved process for preparing portland cement raw material feedstock which may be calcined in cement kilns, including vertical shaft kilns, to produce portland cement.

BACKGROUND OF THE INVENTION

Portland cement is a powdered material which upon the addition of water forms a paste which will fully harden and bond intermixed rock, gravel, and/or sand into concrete. Portland cement is produced by sintering a mixture of raw materials containing calcium carbonate (such as limestone, cement rock, chalk, marl, shell residues, and blast-furnace slag) and aluminum silicates (such as clay, shale, slate, cement rock, and blast-furnace slag). Chemical reactions take place during the sintering process and produce nodules, generally known as "clinkers," which are composed principally of calcium silicates and aluminates.

The portland cement raw materials will react during the clinkering process to form portland cement, according to the following equations:

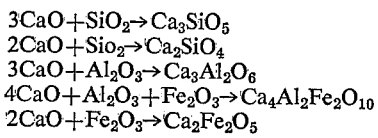

$$3CaO+SiO_2 \rightarrow Ca_3SiO_5$$
$$2CaO+SiO_2 \rightarrow Ca_2SiO_4$$
$$3CaO+Al_2O_3 \rightarrow Ca_3Al_2O_6$$
$$4CaO+Al_2O_3+Fe_2O_3 \rightarrow Ca_4Al_2Fe_2O_{10}$$
$$2CaO+Fe_2O_3 \rightarrow Ca_2Fe_2O_5$$

Other minor reactions also occur during clinkering, as is known in cement chemistry. The resulting clinker is pulverized with a small amount of gypsum (calcium sulphate) to produce the powdered commercial portland cement.

Portland cement may be distinguished from other types of commercial cements by the different phase compositions. Some cements are mixtures of portland cement with other materials. Examples of such mixtures are masonry, slag, and pozzolan cements.

Two general processes are currently used for the preparation of the kiln feed for burning, known as the "dry process" and the "wet process." In the dry process, the raw materials are ground in the dry state whereas in the wet process, water is added to the raw materials before or during grinding to produce a slurry of a creamy consistency. In both types of feed preparation processes, the ground material is generally stored in a series of correction bins, which allow a final precise adjustment of the kiln feed composition.

The rotary kiln is used almost exclusively in modern United States portland cement production. The socalled vertical, or shaft, kiln was used for producing limes and cements prior to the introduction of the rotary kiln and is still used in cement production in some countries.

The same care in preparing the raw materials that are used in the rotary kiln feed preparation must be observed in vertical kiln feed preparation. Conventionally, about 6% anthracite coal or coke in finely divided sizes is blended into the raw mixture. The vertical kiln is known to be economical in the usage of fuel and space but generally produces a product which is inhomogeneous and undependable, and also has a relatively low capacity.

The lack of uniformity of the vertical kiln clinker has been attributed to irregular concentrations of coal ash at the locations where each lump was burned and also to the development of void spaces, caused by gas generation or bed shrinkage, with the consequential channeling of heating gases, thereby causing nonuniform burning. The voids caused by gas generation, such as the production of carbon dioxide from calcium carbonate, can cause a volume shrinkage of 30–40%. If there is water present in the kiln feed, an even greater shrinkage will be observed. Shrinkage of the kiln bed is detrimental in the processing of the raw material to cement clinkers in a vertical kiln. During the burning operation in the kiln, the shrinkage of the bed produces a tendency for the bed to pull away from the walls of the kiln. With a void space developed along the walls of the vertical kiln, the hot gases which are heating up the briquettes will channel up the wall and thereby cause uneven heating. This uneven heating will more than likely result in a nonuniform product which is of poor quality.

Conventional vertical shaft kiln feeds, even after a briquetting operation, will have a volume shrinkage of about 30 to 40 percent, and if water is present in the raw mix (such as in nodules prepared on a pan nodulizer without compacting pressure), the shrinkage may be even greater.

A comprehensive description of prior art portland cement processes will be found in Kirk-Othmer, Encyclopedia of Chemical Technology, second edition, volume 4, pages 684–710 (particularly pages 697–703), Interscience Publishers, New York, 1964, the disclosure of which is herein incorporated by reference.

In the conventional process for preparing kiln feed, the raw materials, generally consisting of a mixture of naturally occurring minerals, in the proper proportions for producing portland cement, are ground to a very fine state of subdivision, either in a dry condition or as an aqueous slurry. When ground as an aqueous slurry (wet process), the resulting slurry is either sent directly into a rotary kiln or else is preconditioned, generally by filtration or by passage through a heat exchange device, to reduce or eliminate the water prior to introduction into the kiln. When ground in the dry state (dry process), the material in the finally divided state may be introduced directly into a rotary kiln or else may be passed through a preheating device (such as the ACL system) before introduction into the kiln. An alternative process for preparing feed materials which have been ground and blended in the dry state is to perform the ground material into a shaped feed, either by balling or extruding the material, using a small amount of water to hold the ground material together until it has acquired a definite shape.

When a rotary kiln is used for clinkering the feed materials to produce portland cement clinker, any of these methods of preparing the feed material may be used. In order for the chemical reaction between the lime and the other components to take place, the feed material must be heated to the point of incipient fusion. At this point, about 20% of the feed constituents form a viscous glassy phase. Some of the clinkering reactions take place in a solid state, while other reactions take place through solution and precipitation in the glassy phase. The oxides of calcium, silicon, aluminum and iron must be in close contact during the clinkering process in order to complete the reactions within reasonable times. The rotary action of the kiln produces a kneading action on the semiplastic hot material and causes it to form into dense balls or nodules, thereby facilitating the clinkering reactions.

As previously mentioned, vertical shaft kilns are not in common use in Northern America despite the advantages of a vertical shaft kiln, as compared to a rotary kiln, such as the heat utilization efficiency and low capital cost. When a vertical shaft kiln is used to produce portland cement clinker, it is essential that the mixture be shaped into nodules, lumps, bricks, or some other extruded shape in order to allow ready passage of hot gases through the mixture bed to accomplish heating to the clinkering temperature. This shaping or forming of the ground or powdered feed material also aids the clinker process by placing the various mineral oxides in close proximity to each other, so that the glassy phase formation and solid-to-solid reactions may easily take place. The nonuniform, poor quality products previously obtained from vertical shaft kilns are believed caused by the fact that the shaped raw materials previously prepared for vertical shaft kiln feed contained water and carbon dioxide in the form of calcium and magnesium carbonates. Therefore, gases are evolved from the feed material within the kiln after the heating process begins. In addition, it is common practice in vertical shaft kiln processes to include a solid fossil fuel, in a finely divided state, in the nodule, brick or other feed shape. Such fuels are oxidized, the combustion products escape from the shaped feed material. This generation and release of gases from the shaped feed material creates many small voids which separates the oxides from each other.

In order to overcome these voids, which are obstacles to the clinkering reactions, it is necessary, since there is no kneading action in the vertical shaft kiln as in the rotary kiln, to raise the temperature of the shaped material to a higher level than is absolutely necessary for accomplishing the clinkering reactions. This increased temperature permits more of the mineral oxide components to combine in the glassy phase and reduces the viscosity of the glassy phase so that the reaction can go to completion even in this state of relative separation of the components.

When the temperature is increased to the required level for obtaining complete clinkering reaction in a vertical shaft kiln, the creation of more of the glassy phase, and its lower viscosity, causes the formed shapes to fuse to one another and to compact together due to the weight of material above that portion which is being reacted. Such results have two very serious effects on the operation of the vertical shaft kiln. First, the compaction and the fusing upsets the upward flow of air and hot gases and causes channeling into areas of the bed where the resistance is least. This channeling effect in turn results in an uneven heating and cooling action in the bed of material. Therefore, some of the feed material passes through the kiln without being subjected to a high enough temperature to produce a sound, well-reacted product, while other material is overburned. Secondly, the fused, agglomerated shaped material cannot be removed from the kiln after cooling in the lower part of the kiln unless such fused and agglomerated shapes are crushed at the discharge end of the kiln, which is an expensive and unsatisfactory operation.

The above problems in the operation of vertical shaft kilns are well known to those of ordinary skill in the cement art. Because no satisfactory solution has been previously advanced, the quality of cement produced by vertical shaft kilns is so poor that such kilns are not used to an appreciable extent in areas where material specifications, or quality standards, are high, such as North America. Also, the requirement for a crushing device in the discharge end of the kiln has limited the production capacity of vertical shaft kilns in other parts of the world, even when the relatively poor quality product is acceptable.

OBJECTS OF THE INVENTION

It is an object of this invention to provide a process for the preparation of portland cement kiln feed. It is another object of this invention to provide a process for the preparation of vertical shaft portland cement kiln feed. It is a further object of this invention to provide an improved process for the preparation of vertical shaft portland cement kilns feed, whereby the prior disadvantages of the use of vertical shaft kilns are overcome. It is yet another object of the invention to provide a vertical shaft kiln process for producing portland cement which produces uniform, high quality cement.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes or modifications within the scope of the invention will become apparent to those skilled in the art from this detailed descripion.

SUMMARY OF THE INVENTION

According to the present invention, improved portland cement kiln feed is prepared by decarbonating and dehydrating the calcareous, argillaceous and siliceous materials, and thereafter shaping such decarbonated and dehydrated materials into a formed feed material by briquetting or tableting. The briquetting or tableting is performed in a dry state, preferably without the inclusion of a fossil fuel. Kiln feed materials when formed according to the present invention have been found to have considerable strength and can be heated to clinkering temperatures, such as 2400° F. to 2600° F., without losing shape, changing volume or fusing together. With such characteristics, the kiln feed prepared by the present process is an ideal feed for vertical shaft kilns, as the problems previously encountered in such kilns are eliminated.

ADVANTAGES OF THE INVENTION

In the present process, the various portland cement raw materials, i.e., calcareous, argillaceous and miscellaneous correction components, such as sand and/or iron ore, are dried (dehydrated) and calcined (decarbonated). The materials are finally ground, blended together, and briquetted without adding any constituent which could produce a gas in the clinkering operation. The kiln feed produced by the present process has the following advantages:

(a) There is very intimate contact between the mineral oxides which must act to form portland cement, thereby permitting quite rapid reactions and high clinkering kiln capacity.

(b) There is a negligible evolution of gas during the clinkering operation, and the briquettes have few air voids, so there is little change in the volume of the briquettes during the clinkering operation. With this slight, if any, change in briquette volume, the clinkering kiln exhibits very little bed shrinkage.

(c) As negligible amounts of gas will be formed during the clinkering reaction, there is no disruptive source created within the briquette, tending to shatter the briquette, as generally occurs with nodulized kiln feed. This shattering is highly undesirable in the operation of a vertical shaft kiln where the heating gases must uniformly pass up through the bed of briquettes.

(d) The briquettes formed according to the process of the present invention can be processed in a vertical kiln with very little, if any, addition of fuel after the initial start-up. The clinkering reactions are exothermic and, with the heat economy of the vertical kiln, allow the reaction to proceed without the significant addition of fuel.

(e) The briquettes of the present invention remain dense throughout the clinkering kiln operation and heat transfer to and from the center of the briquette to the outside is much more rapid than if the material were porous or contained air or bubbles.

DESCRIPTION OF THE INVENTION

It has unexpectedly been discovered that durable briquettes may be easily formed from a calcined and dehydrated raw material mix without requiring any binder by the use of high pressure during the briquette-forming stage. The briquette-forming pressure, or compacting pressure, applied to the calcined and dehydrated mix, may vary from a compacting pressure of from about 5,000 p.s.i. to about 150,000 p.s.i. Preferably, the briquette compacting pressure will be from about 35,000 p.s.i. to about 75,000 p.s.i.

The calcareous materials are calcined by heating to drive off carbon, generally by the generation of carbon dioxide gas. As the carbon in such materials as limestone is generally in the form of calcium carbonate or other metal carbonates, such materials must be heated at a temperature high enough to decompose the carbonates into the metal oxide and carbon dioxide. Generally, this temperature will be at least 1400° F., and, preferably the calcination temperature is within the range of 1500° F.–1800° F. Preferably calcareous materials are calcined to drive off enough carbon that the kiln feed has less than ½% by weight, based on the total weight, of atomic carbon. In any case, the kiln feed must have less than 10% total loss on ignition.

The dehydration of the remaining raw materials (that is, other than calcareous materials), is preferably at a high enough temperature to drive off both free water and combined water. The materials are generally heated to a dehydrating temperature of 1000° F. and preferably to a temperature of 1500° F.–2000° F. These raw materials preferably have water removed to the point that the kiln feed has less than ½% by weight, based on total weight, of free water plus combined water, although the moisture content may be higher, e.g., 5% moisture.

The briquette operation may be at ambient temperature or at any temperature from ambient temperature up to 1700° F. Preferably, the briquetting operation is performed with the material heated to a temperature of between about 500° F. and about 1700° F. It is believed that the briquettes formed from material heated to within the above range react more readily than those formed from room temperature material due to higher density and more intimate contact between the components.

While the calcined and dehydrated materials may be briquetted to any of a wide variety of shapes, including pyramids, cubes, rectangles, etc., it is preferred that the briquettes should have an oval or rounded shape. Such rounded shapes minimize the area of contact where the shaped briquettes contact each other in the clinkering kiln. This results in a further reduction in the tendency of the shaped forms to fuse to each other or agglomerate.

The briquettes produced by the process of the present invention need only to be heated up to about 2350° F. and the cement compounds will begin to form with the release of heat due to the exothermic reaction. The preferred temperature range for the clinkering operation is 2400° F. to 2700° F., and the most preferred range is 2500° F.–2600° F. In the vertical shaft kiln operation, cold air enters the bottom of the kiln and flows upward in counter-current relationship to the descending flow of briquette solids. The reactions zone is generally near the center section of the kiln, that is, near a point midway between the top and the bottom of the kiln. The air moving upward is heated by the briquettes which have passed through the reaction zone, and the briquettes are cooled by this air flow to about ambient temperature before the discharge thereof from the kiln. In the reaction zone itself, the air temperature will jump upwards several hundred degrees and the heat from the reaction raises the temperature of the briquettes. The hot gases which have passed through the reaction zone then proceed up through the kiln, passing through the relatively cold briquettes which are continuously introduced into the top of the kiln, thereby preheating the briquettes before they are introduced into the reaction zone. This counter flow of gas and solids cools the gas to a temperature which is only somewhat warmer than the ambient temperature.

It will readily be appreciated that the vertical shaft kiln will be quite economical in heat utilization. The only heat losses will be in the air leaving the top of the kiln and the briquettes leaving the bottom of the kiln (in each case only slightly warmer than the air introduced to the bottom of the kiln, and the briquettes entering the top of the kiln, respectively), plus losses due to radiation through the kiln wall.

Feed prepared by the process of the present invention requires only enough heat input to the kiln to raise the temperature of the burden to the clinkering temperature, as there are no endothermic heat requirements for decarbonation or for evaporation of water. The exothermic heat of reaction from the combination of calcium oxide with silica and alumina to form calcium silicates and calcium aluminates reduces, if not eliminates, the heat requirements of the kiln operation. If additional fuel is needed, it may be introduced as a gas or a vaporized liquid into the heating zone of the kiln. Although not a preferred embodiment, minor amounts of solid fuels may be introduced with the charge if the proportion thereof are kept at such a level as to avoid channeling. Generally, less than 1 percent of solid fuel may be added to the kiln charge without causing channeling.

As the briquettes are produced under substantial compacting pressure, the finely divided mineral oxides, or feed, will be in quite intimate contact. This intimate contact of the mineral oxide allows the reactions to proceed quite rapidly upon reaching the clinkering temperature. Therefore, the vertical shaft kiln may be designed with a low residence time requirement for the kiln burden.

An alternative embodiment of the present invention may be utilized when the portland cement raw materials are high grade limestone and a moist shale or clay. Instead of decarbonating and dehydrating the components, the decarbonated limestone (calcium oxide) may be used to dehydrate the shale or clay. In such cases, the limestone is decarbonated in a calcining kiln and the moist shale or clay is added to the stream of burnt quicklime just as the stream enters a grinding mill. The quicklime dehydrates the shale or clay by taking up the water to form calcium hydroxide [$(Ca)(OH)_2$].

By such a procedure, even though moist raw materials are used the mixture may be ground in a completely dry state, avoiding problems caused by coating or clogging of dry material in the ball mill. Although the calcium hydroxide so formed must be subsequently decomposed to calcium oxide and water during the clinkering operation, thereby evolving a small amount of water vapor from the briquettes and causing a certain degree of shrinkage, such shrinkage will be negligible if the amount of water in the free state, does not exceed the preferred limit of ½% by weight, based on the weight of the clinkering kiln feed.

Figure 2:
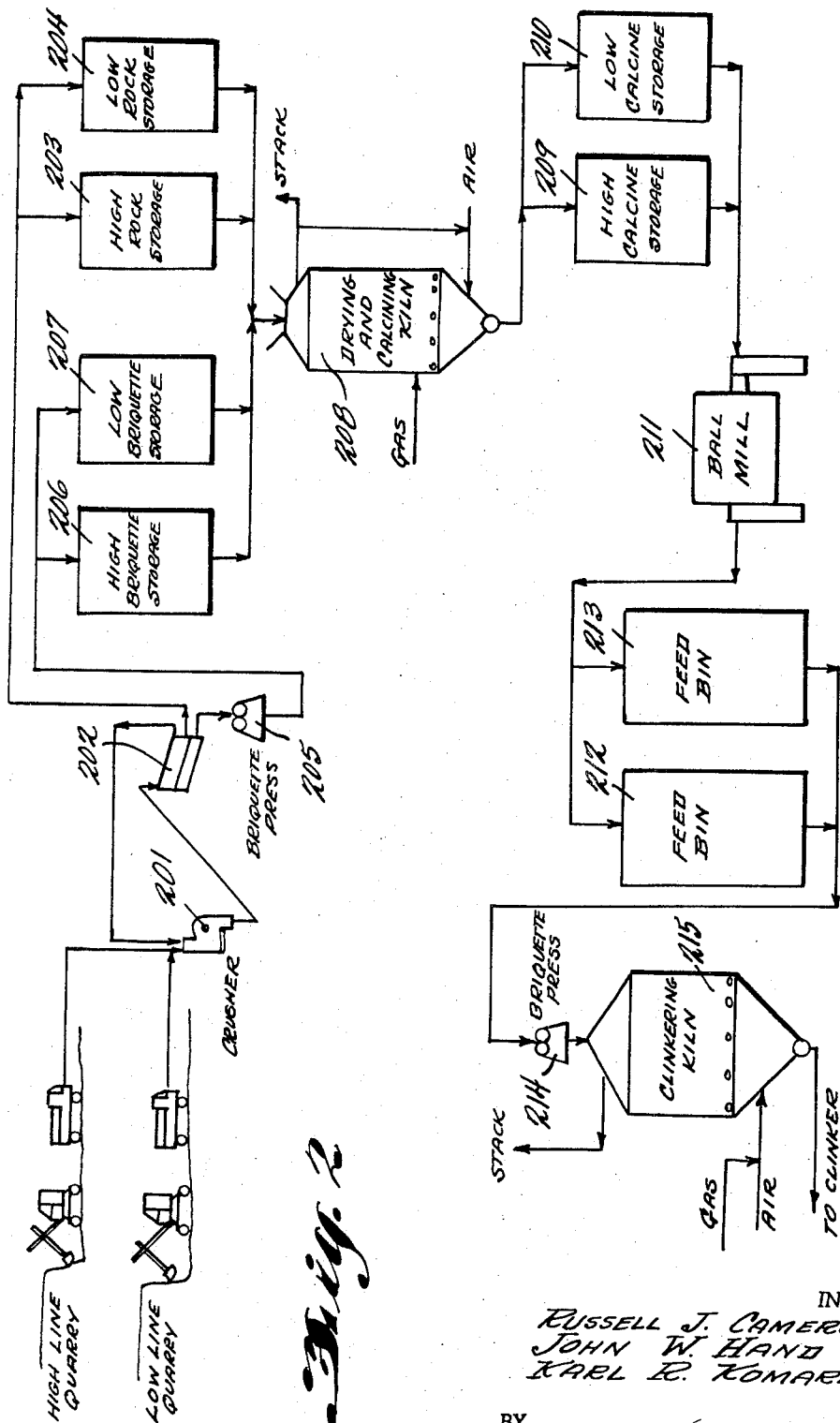

The present invention will be more clearly understood with reference to the accompanying drawings, wherein FIGURE 1 represents a portland cement clinker process of this invention utilizing limestone and shale rock as raw materials; FIGURE 2 represents a flow diagram of a portland cement clinker process of this invention utilizing high and low limestone rock (i.e., limestone rocks of high and low lime content) as raw materials; FIGURE 3 represents a flow diagram of a portland cement clinker process of this invention wherein limestone and clay or other wet materials are used as raw materials. FIGURE 4 represents a flow diagram illustrating an embodiment of the process of FIGURE 3 wherein the clay is dehydrated by reaction with quicklime.

Specifically, in the process of FIGURE 1 limestone and shale rock are quarried, crushed to the proper size (e.g. 2″ size) in crushers 1 and 2, screened in screens 3 and 4, and sent to main storage bins 5 and 6. Oversize material from screens 3 and 4 is returned to crushers 1 and 2, respectively. Limestone fines from screen 3 go to fine limestone storage bin 7. Shale fines from screen 4 are separated, a portion going to the shale feed hopper 8 for the requirements, as needed, of shale as a binder for the fine limestone from storage bin 7, and the remainder of the shale goes to the dried shale storage bin 14.

Fine limestone from storage bin 7, with the necessary amount of shale from shale hopper 8, is fed to a briquetting press 9 and the briquettes so produced are metered into the stream of crushed limestone going from limestone storage bin 5 to the calcining kiln 10.

Limestone from storage bin 5, together with briquettes from briquette press 9, are introduced into the top of calcining kiln 10. Air under pressure is introduced at the bottom of the calcining kiln. Coal, gas, or other fuel may be used to fire the calcining kiln. The products of combustion and calcination pass out of the calcining kiln as relatively hot gases, which are passed through a furnace 11, when coal is used as the fuel, to burn any coal volatiles, and then the hot gases are introduced in the bottom of the drying kiln 12. Shale from the shale storage bin 6 is introduced at the top of drying kiln 12. The counter current flow of hot gas and shale dehydrates the shale and cools the gases, which are passed out of the kiln to a stack.

The calcined limestone produced in calcinating kiln 10 is cooled and stored in quicklime storage bin 13. The dehydrated shale passing through drying kiln 12 is stored in shale storage bin 14. The quicklime and the dried shale in storage bins 13 and 14 are weighed in the correct proportions, fed to a ball mill 15, passed through a continuous X-ray analyzer (not shown), and are stored in feed bins 16, 17.

A blended mix of ground quicklime and shale from bins 16 and 17 is briquetted in briquette press 18 and fed to the vertical shaft, clinkering kiln 19. The clinkering is carried out at a preferred temperature of 2500° F. to 2600° F. Gases exhausted from the kiln carry any alkali fumes to a stack for discharge or to a scrubber for recovery of by-product alkalies. Additional fuel as required may be fed to the kiln with the air supply, or may be separately introduced into the reaction zone of the kiln. The clinker produced in clinkering kiln 19 is passed to storage for subsequent grinding into cement.

In FIGURE 2, high-lime content limestone and low-lime content limestone are quarried and crushed in crusher 201 to the proper size, e.g. minus 2″ size. The crushed material is screened on screen 202, with material of the proper size being sent to storage bins 203 and 204. Fines from the screening operation are briquetted in briquette press 205, with the shale material in the limestone acting as a binder for the briquetting operation. The briquettes so produced are stored in bins 206 and 207.

The drying and calcining kiln 208 is used to calcine the high-lime and low-lime materials in sequence. The off-gases from kiln 208 are recycled as necessary to hold the flame temperature low enough to prevent substantial fusion of the materials being calcined. The calcined materials are passed to storage bins 209 and 210. The high and low lime calcined materials are metered together to produce a mix which is ground in ball mill 211 to produce the clinkering kiln feed composition. A continuous X-ray analyzer (not shown) controls the feed composition at the discharge of ball mill 211. The ground feed composition from ball mill 211 is stored in bins 212 and 213. From bins 212, 213 the ground cement mix is briquetted in briquette press 214 and passed into the vertical shaft clinkering kiln 215. Clinkering is carried out at a suitable temperature (e.g., 2500° F. to 2600° F.). Fuel gas is added with the air supply to maintain the clinkering temperature. The cement clinker produced is sent to clinker storage.

Wet raw materials may also be processed according to the present invention. FIGURE 3 illustrated a portland cement clinkering process utilizing wet raw material feed. Limestone or other high-lime content raw material is quarried, crushed in crusher 301, and stored in limestone storage bins 302 and 303. Shale or clay is washed and slurried with water in wash mill 304 and stored in clay slip tank 305. The lime from storage bins 302, 303 and clay from storage tank 305 are fed into a ball mill 306 and ground to a slurry. The resultant slurry is blended and stored in a thickener 307 to reduce the slurry water content to the desired level. The thickened slurry from thickener 307 is partially dried and modulized in a nodulizer, or rotary drum, 308. The nodulizer 308 preferably has chains, lifters, and/or plows in the feed end for improved heat transfer. Hot exhaust gases from calcining kiln 309 are used to reduce the water content of the material passing through the nodulizer 308 to about 12 percent or less.

The nodules are calcined in calcining kiln 309 with enough gas added to the air supply to maintain the desired calcination temperature. The calcined nodules are crushed in crusher 310 and passed to calcine storage bin 311. From storage bin 311 the calcined material is fed to briquette press 312 and passed, in briquette form, into the vertical shaft clinkering kiln 313. The clinkering is carried out to the proper temperature (e.g., 2500–2600° F.) in the clinkering kiln 313, with the temperature maintained by the exothermic reaction and the addition of gas or other fuel to the kiln. The portland cement clinker produced is sent to storage.

FIGURE 4 illustrates a modification of the embodiment of the invention illustrated in FIGURE 3 wherein high-grade limestone and a moist shale or clay are utilized as the raw materials. The limestone is quarried, crushed in crusher 401, screened on screen 402, and stored in limestone storage bin 403. The limestone is passed from storage bin 403 into drying and calcining kiln 404, which is fired by gas to maintain the proper calcination temperature. The calcined material passing through kiln 404 is sent to quicklime storage bin 405. The clay is quarried and crushed in mill 406. The clay so produced is sent to clay storage 407.

A proper portion of moist clay from clay storage 407 is added to quicklime storage bin 405 and ground in ball mill 408. The quicklime dehydrates the clay by taking up water to form calcium hydroxide. This enables the mixture to be ground in a completely dry state, without any coating or clogging problems in the ball mill. Although calcium hydroxide must be decomposed to the oxide and water vapor during the clinkering operation, it has been found that the amount of water vapor evolved from the briquettes is small and only a negligible amount of shrinkage occurs.

The ground material from ball mill 408 is stored in feed bin 409 and subsequently briquetted in briquette press 410. The briquettes are passed into the vertical shaft clinkering kiln 411, which is maintained at the proper clinkering temperature by fuel addition, as necessary. The portland cement clinker which is thus produced is sent to clinker storage. If desired, the fines from screen 402 can be briquetted in briquette press 412 and passed to limestone storage bin 403.

The invention will be understood more readily by reference to the following examples; however, these examples are intended to illustrate the invention and are not to be construed to limit the scope of the invention.

Example I

Portland cement was produced from lime, shale, and sand. The raw materials had the following analyses:

TABLE 1

| | Raw Materials Analyses, Percent | | |
|---|---|---|---|
| | Lime | Shale | Silica |
| $SiO_2$ | ND | 51.25 | 98+ |
| $Al_2O_3$ | ND | 18.06 | ND |
| $Fe_2O_3$ | ND | 8.98 | ND |
| CaO | 94.70 | 1.43 | ND |

The silica sand was ground to a fineness of 80% passing a 200 mesh screen. The lime and shale were combined with the ground silica sand in the proportion shown below:

TABLE 2.—MIX PROPORTIONS

| | Pounds |
|---|---|
| Lime | 199.2 |
| Shale | 87.0 |
| Sand | 13.8 |

All of the materials were ground together to a fineness of 80% minus 200 mesh.

Three analyses of the ground material produced the following composite analyses.

TABLE 3

| | Analyses of Composites | | |
|---|---|---|---|
| | Batch 1 | Batch 2 | Batch 3 |
| CaO | 62.56 | 62.74 | 61.75 |
| $SiO_2$ | 20.69 | 20.99 | 21.44 |
| $Al_2O_3$ | 6.35 | 5.72 | 6.00 |
| $Fe_2O_3$ | 2.44 | 2.50 | 2.41 |
| Totals | 92.04 | 91.95 | 91.60 |

The shale utilized has a fairly high alkali content, believed to be in the order of 5% by weight of $Na_2O$ plus $K_2O$. Expressing the four major components on the basis of 100%, and computing the cement compounds according to ASTM procedure, the calculated cement compounds were as follows.

TABLE 4

| | Cement Compounds, Percent | | |
|---|---|---|---|
| | Batch 1 | Batch 2 | Batch 3 |
| $C_3S$ | 55 | 60 | 47 |
| $C_2S$ | 24 | 20 | 31 |
| $C_3A$ | 13 | 11 | 14 |
| $C_4AF$ | 8 | 9 | 8 |
| Totals | 100 | 100 | 100 |

Briquetting was accomplished on a briquetting machine equipped with rolls approximately 20" in diameter containing five rows of almond-shaped briquette pockets. These pockets produced briquettes approximately 1" x ¾" x ½". Three different briquetting tests were used as follows:

Test A.—The ground material was fed at room temperature into the briquetting rolls. The separating force on the briquqetting rolls of the machine used was controlled by a hydraulic system. An indicated hydraulic pressure of 2000 p.s.i. was used, resulting in a force on the rolls of about 50 tons and producing a pressure applied to the ground material (the briquettes) of approximately 40,000 p.s.i.

Test B.—This test was conducted utilizing the same force on the briquetting rolls as in Test A. However, the ground material was heated to about 1500° F. prior to briquetting. The ground material was heated in a refractory lined rotating drum fired by natural gas. During transfer of the material from the drum heater to the hopper on the briquetting machine, an estimated 100° F. heat loss occurred.

Test C.—Both temperature and pressure were raised for Test C. The ground material was heated to 1800° F. and transferred to the briquetting machine as before. The pressure on the hydraulic system was 3000 p.s.i., which corresponds to a pressure applied to the briquettes of about 60,000 p.s.i.

In all tests, briquettes formed easily and were dense and exhibited good strength.

An electric furnace with Super Kanthal electrodes was used for clinkering the briquettes. Samples from each briquetting test run were stacked three briquette layers deep in ordinary fire clay boats. Two boats each containing three samples were introduced into the furnace for each run. The furnace was equipped with a circular chart recorder which was utilized to determine the point from which to measure time in the tests. The furnace was brought to the desired temperature and the subsequent introduction of the sample caused a cooling of the furnace of approximately 200° F. The furnace recovered the desired temperature in about 20 minutes. The times shown in the following table of results were measured from the point that the controller for the furnace cut out after recovering to the desired temperature. Free lime determinations were conducted on all heated samples.

The first runs were conducted at 2500° F. and at varying times, as reported in Table 6 below:

TABLE 5.—FREE LIME DETERMINATIONS—HEATING TRIALS AT 2,500 °F.

| Run No. | Time, mins. | Free Lime, Percent | | |
|---|---|---|---|---|
| | | Briquette Test A | Briquette Test B | Briquette Test C |
| 1 | 30 | 2.21 | 1.15 | 1.99 |
| 2 | 15 | 3.81 | 1.60 | 2.70 |
| 3 | 5 | 5.00 | 2.09 | 3.61 |

The next series of trials were conducted by holding the time for each test at 5 minutes and varying the temperature. The results are shown in Table 7. Included in the table are the 5 minute tests shown in Table 6.

TABLE 6.—FREE LIME DETERMINATIONS—HEATING TRIALS AT 5 MINUTES

| Run No. | Temperature, °F. | Free Lime, Percent | | |
|---|---|---|---|---|
| | | Briquette Test A | Briquette Test B | Briquette Test C |
| 4 | 2,400 | 7.82 | 5.19 | 6.41 |
| 5 | 2,450 | 6.42 | 5.19 | 5.32 |
| 3 | 2,500 | 5.00 | 2.09 | 3.61 |
| 6 | 2,550 | 2.83 | 1.31 | 2.08 |
| 7 | 2,600 | 1.60 | .72 | 1.29 |

The principal objective of the above clinkering test was to determine the tendency of the briquettes to agglomerate and fuse together during the clinkering operation. In all tests, the briquettes were piled three layers deep in the fire clay boats. After clinkering, the boats were removed from the furnace and allowed to cool to room temperature. In all cases, the top two layers of briquettes could be easily moved after cooling in the fire clay boat with a light touch of one finger, although all of the briquettes in contact with the fire clay boat reacted with the fire clay, forming a hard glassy interface. As is readily seen, a mixture of calcined lime, shale, and sand can be briquetted over a wide range of conditions and produce briquettes which have good mechanical stability and reduced tendencies to agglomerate and fuse during the clinkering operation.

Example II

A raw mix of the following composition, on a loss free basis, was used in this example:

| | Percent |
|---|---|
| $SiO_2$ | 22.02 |
| $Al_2O_3$ | 5.78 |
| $Fe_2O_3$ | 3.06 |
| CaO | 63.33 |
| MgO | 1.09 |
| $SO_3$ | 3.20 |
| $Na_2O$ | .23 |
| $K_2O$ | 1.01 |

This mix was made with a limestone-shale having approximately 2.5% kerogen content and to which 2.5% ground coal was added. Batch D of the above mix was briquetted cold with no additional separation after grinding. Batch E was briquetted cold, fired in a batch rotary kiln at 1700° F.–1800° F. to burn out the coal and partially decarbonate the limestone, and then briquetted the second time.

Loss on ignition determinations were made on the briquetted material. The results are as follows:

TABLE 7

| Batch | H₂O, Percent | Loss on Ignition, Percent |
| --- | --- | --- |
| D | .4 | 37.1 |
| E | 0 | 10.7 |

The table below gives the free lime determinations of the samples after they were clinkered at various temperatures and lengths of time in an electric furnace:

TABLE 8

| Run No. | Temperature, °F. | Time at Temp., mins. | Percent Free Lime | |
| --- | --- | --- | --- | --- |
| | | | Batch D | Batch E |
| 8 | 2,400 | 5 | .98 | .90 |
| 9 | 2,500 | (¹) | .42 | .36 |
| 10 | 2,500 | 5 | .42 | .33 |
| 11 | 2,500 | 15 | .30 | .30 |
| 12 | 2,500 | 30 | .28 | .21 |
| 13 | 2,600 | 5 | .35 | .27 |
| 14 | 2,600 | 40 | .27 | .25 |

¹ Up to temperature.

The data shows that essentially complete reaction took place at all temperatures above 2400° F. The results give only a slight indication that the calcined briquettes were more easily reacted than the cold briquettes. The total volume shrinkage occurring during clinkering was as follows:

TABLE 9

Batch: Percent shrinkage
D _____ 41
E _____ 28

The calcined briquettes of Batch E were apparently only about 60% decarbonated, which accounts for the volume shrinkage during clinkering. In spite of this relatively high carbon content, Batch E exhibited highly significant improvement in shrinkage reduction over Batch D.

Obviously many modifications and variations of the present invention are possible in the light of the above teachings. It is therefore to be understood that within the scope of the appended claims the invention may be practiced otherwise than as specifically described.

What is claimed is:

1. A process for the production of portland cement clinker from calcareous compounds, argillaceous compounds, and miscellaneous corrective components in a vertical shaft kiln, comprising decarbonating the calcareous raw materials at a temperature of at least 1400° F., dehydrating the other raw materials at a temperature at least 1000° F., mixing the decarbonated materials and the dehydrated materials together and briquetting the resultant mixture at a briquetting pressure of at least 5000 p.s.i., and clinkering the briquettes at a temperature of at least 2350° F. in a vertical shaft kiln, to thereby produce portland cement clinker.

2. The process as claimed in claim 1 wherein said calcareous materials are decarbonated at a temperature of about 1500° F. to about 1800° F.

3. The process as claimed in claim 2 wherein the dehydration is at a temperature of about 1500° F. to about 2000° F.

4. The process as claimed in claim 3 wherein said clinkering temperature is about 2500° F. to about 2600° F.

5. The process as claimed in claim 4 wherein the portland cement raw materials are briquetted at a temperature of about 500 to about 1700° F.

6. The process as claimed in claim 5 wherein the briquetting is accomplished by applying a force of about 35,000–75,000 p.s.i. to the briquettes.

7. The process as claimed in claim 6 wherein said briquettes are of rounded exterior shapes whereby adjacent briquettes have no greater than line contact.

8. A vertical shaft portland cement kiln feed comprising a mixture of limestone and a member selected from the group consisting of shale, clay and mixtures thereof, said mixture in briquette form and essentially free of free and combined water and carbonaceous compounds.

9. The kiln feed as claimed in claim 8 wherein said mixture contains less than ½% by weight, based on the total weight of the mixture, of atomic carbon, and less than ½% by weight, based on the total weight of the mixture, of free water and combined water.

10. A process for the production of portland cement clinkering vertical shaft kiln feed from calcareous, argillaceous, and miscellaneous corrective component raw materials, said process comprising: (a) decarbonating the calcareous raw material at a temperature of at least 1400° F., (b) dehydrating the other raw materials at a temperature of at least 1000° F., (c) mixing the raw materials together, and (d) briquetting the mixture at a briquetting pressure of at least 5000 p.s.i., wherein the mixture which is briquetted contains less than ½% by weight, based on the total weight of the mixture, of atomic carbon, and less than ½% by weight, based on the total weight of the mixture of free and combined water, whereby the briquetted portland cement clinkering vertical shaft kiln feed has improved integral strength and reduced shrinkage.

11. The process as claimed in claim 10 wherein said calcareous materials are decarbonated at a temperature of about 1500° F. to about 1800° F.

12. The process as claimed in claim 11 wherein the dehydration is at a temperature of about 1500° F. to about 2000° F.

13. The process as claimed in claim 12 wherein the portland cement raw materials are briquetted at a temperature of about 500 to about 1700° F.

14. The process as claimed in claim 13 wherein the briquetting is accomplished by applying a force of about 35,000 to about 75,000 p.s.i. to the briquettes.

15. A process for the production of portland cement clinkering vertical shaft kiln feed from calcareous, argillaceous, and miscellaneous corrective component raw materials, said process comprising: (a) decarbonating the calcareous raw material at a temperature of at least 1400° F., (b) dehydrting the other raw materials by mixing with the decarbonated calcareous material, and (c) briquetting the mixture at a briquetting pressure of at least 5000 p.s.i., whereby the briquetted portland cement clinkering vertical shaft kiln feed has improved integral strength and reduced shrinkage.

16. The process as claimed in claim 15 wherein said calcareous materials are decarbonated at a temperature of about 1500° F. to about 1800° F.

17. The process as claimed in claim 16 wherein the portland cement raw materials are briquetted at a temperature of about 500° F. to about 1700° F.

18. The process as claimed in claim 17 wherein the briquetting is accomplished by applying a force of about 35,000 to 75,000 p.s.i. to the briquettes.

References Cited

UNITED STATES PATENTS 2,654,594  10/1953  Somogyi _____ 263—53
3,098,886   7/1963  Friese _____ 263—53

FREDERICK L. MATTESON, JR., *Primary Examiner.*

R. A. DUA, *Assistant Examiner.*